United States Patent [19]

Merdan

[11] 4,410,945
[45] Oct. 18, 1983

[54] HIGH SPEED PROGRAMMING OF A COMPUTER

[76] Inventor: James D. Merdan, 1097 VanDyke, Appleton, Wis. 54910

[21] Appl. No.: 250,099

[22] Filed: Apr. 27, 1981

[51] Int. Cl.³ .......................... G06F 3/033; G06F 3/14
[52] U.S. Cl. ........................................ 364/200; 382/61
[58] Field of Search ... 364/200 MS File, 900 MS File; 179/2 DP; 340/146.3 F; 237/475; 382/61

[56] References Cited

U.S. PATENT DOCUMENTS

| | | | |
|---|---|---|---|
| 3,114,980 | 12/1963 | Davis | 340/146.3 F |
| 3,453,595 | 7/1969 | Barrekett et al. | 340/146.3 F |
| 3,454,936 | 7/1969 | Bridge et al. | 364/200 |
| 4,021,777 | 5/1977 | Shepard | 382/61 |
| 4,075,679 | 2/1978 | Christopher et al. | 364/200 |

*Primary Examiner*—Harvey E. Springborn
*Attorney, Agent, or Firm*—James T. Barr

[57] ABSTRACT

This invention is concerned with an arrangement for automatically recognizing and identifying symbols and characters appearing in written form to be utilized by a connected process as input information for a high speed computer.

3 Claims, 6 Drawing Figures

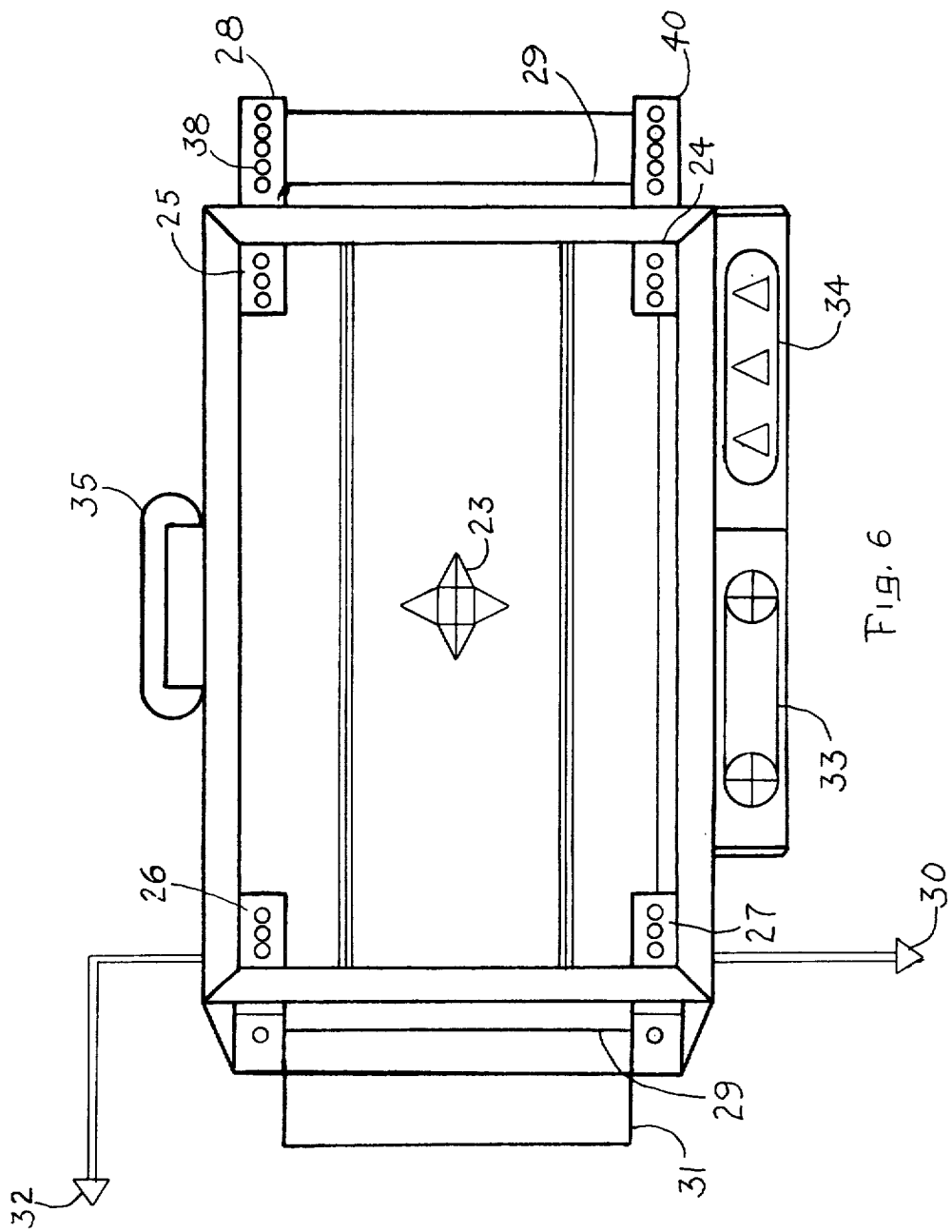

HIGH SPEED PROGRAMMING OF A COMPUTER

SUMMARY OF THE INVENTION

Computers can be broadly categorized into two classes, analogue and digital. In the former, a variable quantity that is to be studied or manipulated is represented by an electrical potential. The machine qualities are said to be analogous to the actual quantities. In the digital computer, the variable quantities are represented by numerical or special character codes, usually in the binary number system; but not necessarily restricted thereto.

Since each type of computer has limitations, as well as advantages, there is an advantage in hybrid techniques, partly analogue and partly digital. In many applications, hybrid techniques have been able to exploit the best features of both classes and yield a better result (faster computation with a given accuracy level and less equipment) than either the completely analogue or the completely digital techniques. The present invention applies itself to both, but is mainly concentrated on the digital technique, making it more efficient and adaptable in both instances.

There are three distinguishable characteristics of the present day digital computer; one, an addressible memory to hold a stored sequence of operations to be carried out automatically (the program), the necessary data, and intermediate results; two, the concept of logical decision making, or the ability to automatically take specified alternate courses of action depending upon the outcome of a particular operation; and three, extremely high speed for up to one million or more operations per second.

The operations carried out by a digital computer are generally very simple, such that a problem of any complexity must be broken down into a program, which consists of instructions usually expressed in a code, as in this case, represented by numeric, alphabetic or special characters.

Breaking down a logical problem into component parts, each of which is within the scope of the particular computer used, is a skilled vocation, and much of the success of digital machines depend upon the ability of the individual programmer. With more versatile machines, such as the present invention, it becomes possible to devote more time of the machine's capacity to preparing its own detailed program from handwritten instructions fed into it via the present invention. Automatic coding techniques that relieves the programmer of most of the assiduity involved, allows him or her to concentrate on the logical problems involved and express the resulting instructions through coded characters in almost plain language. The progress that has been made in the development of computer languages for scientific, engineering and business uses almost approach natural language, and thus permits individuals to easily prepare their own programs.

More specifically, the process described herein will concern itself with the several programming steps necessary before information or problem solving situations can be utilized by a computer. Much of the subsequent development of digital computers is devoted to attacking the twin problems of speed and reliability; present speeds of many millions of operations per second are attained, so that the need for reliability is even more imperative. By eliminating steps in the programming procedure, the present invention solves much of these difficulties.

The functional elements of a digital computer are grouped into four major categories: one, the arithmetical unit or special character, which performs tasks such as addition, multiplication, logical comparison, etc.; two, the memory in which data and sequences of instructions are stored; and three, the input-output system, which permits the entry of programs and data and the output of the results; and four, the instruction control unit which interprets the sequence of operations (program) stored in the memory and controls the other functional units appropriately. The present invention will utilize these elements but in such an arrangement as to make the whole process more efficient.

The primary object of this invention then is to eliminate two steps in the aforementioned programming process by means of a special optical reader. The programmer will write a program for the computer employing a particular language and a special coding form, shown in detail in the accompanying drawings, that can be easily picked up by an optical reader. This information is then incorporated into the computer library or memory by means of an acoustical coupler, either portable or incorporate within the system. Once this has been accomplished the stated program can be exhibited on the computer display screen for purposes of update, verification or correction. This consequently eliminates two steps in the programming procedure; the key punch operation and the verification procedure, thus allowing for less equipment and making the programmer's task more efficient and productive. Furthermore, and maybe the most important factor, is security of the computer system. Computer theft is one of the biggest problems encountered in the computer industry today. The present invention, by eliminating the foregoing steps, allows for a tighter security system.

DETAILED DESCRIPTION

Other objects and many of the attendant advantages of the invention will be apparent as the same becomes better understood by reference to the following detailed description, which considered in conjunction with the accompanying drawings in which like reference numbers designate like parts throughout the figures thereof and wherein:

FIG. 6 shows the optical reader device in its entirety.

Figure 1:
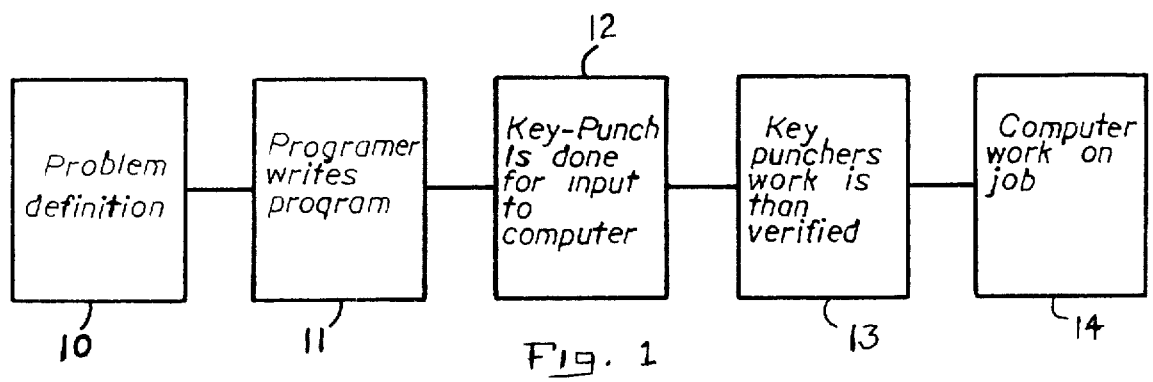
FIG. 1 is an example of the prior art, step by step programming procedure from start to finish as it applies to computer programming without benefit of the present invention.

Referring now to FIG. 1; the known method for computer programming requires the programmer to conduct four basic steps to computer activity. The first of these steps is problem definition 10 in which the programmer defines the problem and then constructs a possible solution to that problem.

In the second stage 11, the programmer writes out by hand the intended program. This action is facilitated by means of doing the coding instructions on standardized coding sheets. Depending upon the language used, there will be a special coding form used to accomodate existing equipment, thereby allowing the programmer to adapt his formation or location of the symbols, (numerals) to the requirements of the reading device.

The next stage 12 is the key punch operation for input to the computer. The aforementioned coding sheets containing the instructions and/or problems are transferred from the hand written sheets by means of typing the information off these sheets to standardized eighty column cards for input to the computer. Computers have been much used to extend the scope of punched card systems and similar office equipment to accept said information from card readers capable of reading up to five hundred cards (each carrying up to nine hundred sixty binary digits) per minute, much slower and inefficient then the present invention. With the special coding and incorporated optical reader, the speed is almost impossible to measure.

The final stage 13, before the problem can be finalized, requires verification to ensure correctness and accuracy. Depending upon the size and complexity of the job, could take considerable time and effort to accomplish. The block 14 is then the actual computer activity.

Figure 2:
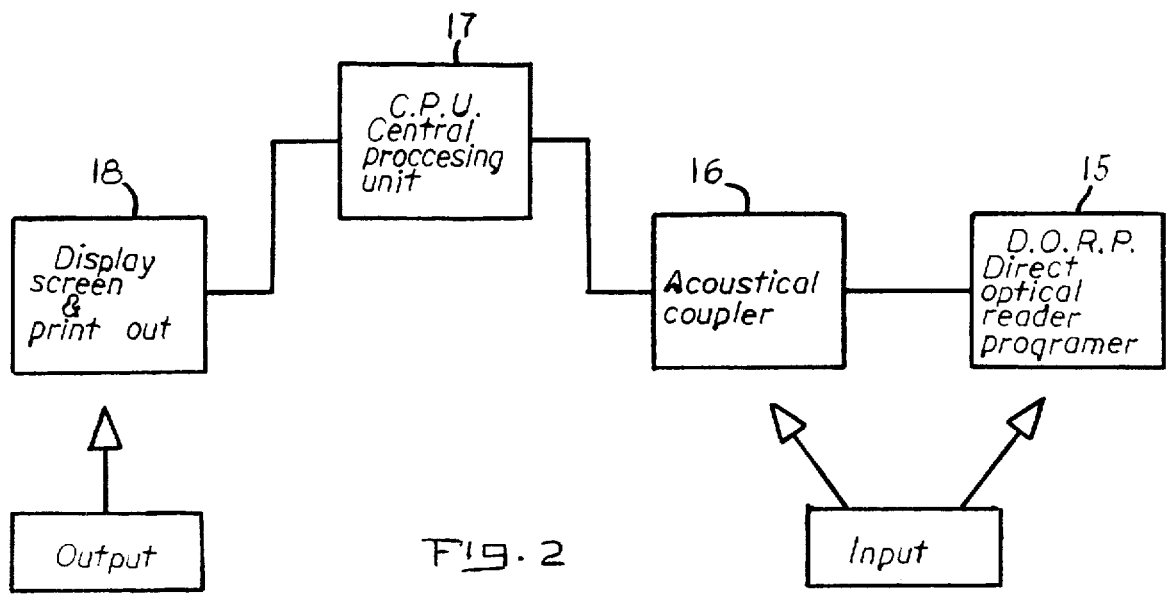
FIG. 2 is the basic layout of the present invention which illustrates the equipment arrangement.

FIG. 2 indicates how each key piece of equipment is arranged in accordance with each other. The block 15 is the direct optical reader programmer, shown in detail in FIG. 6. The block 16 refers to an acoustical coupling device which ties into the central processing unit 17. Block 18 is the terminal display screen which gives access to the library of the computer, which in turn allows for checking, updating and problem solution. At this stage, a print-out may also be available, depending upon the equipment being used.

Figure 3:
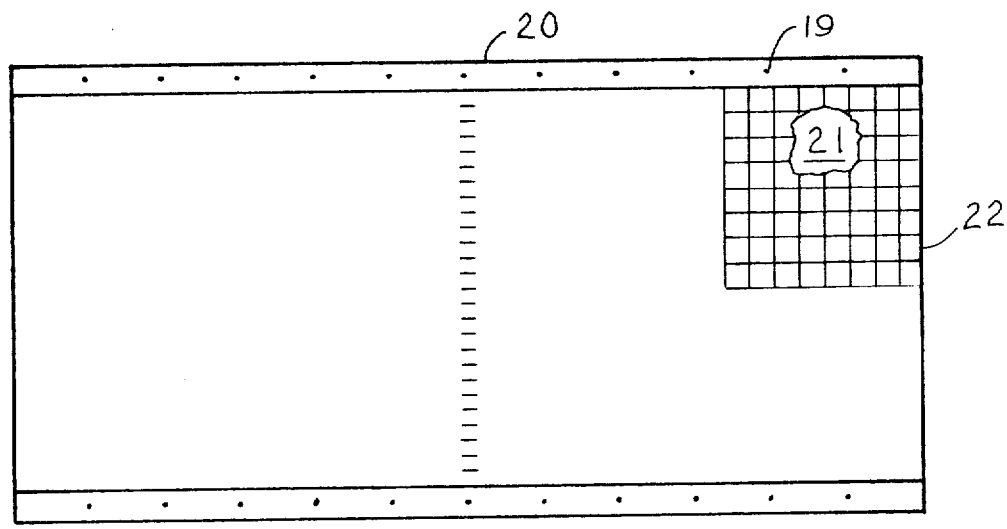
FIG. 3 is an example of the programmer's coding sheet that is contiguous perforated and rolled form.
Figure 4:
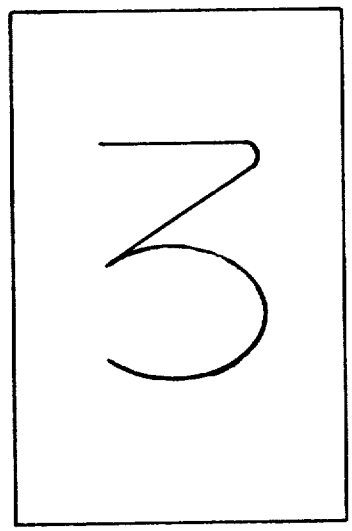
FIGS. 4 and 5 are examples of the individual coding blocks which contain all numeric, alphabetic or special characters that are scanned by the optical reader device.
Figure 5:
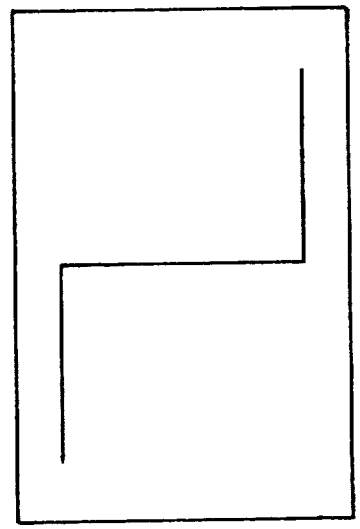

FIG. 3 is an example of the modified standardized coding sheet used in the present invention. The only modifications to the standard coding sheet being the use of perforated tear-off lines 20 and the punched holes 19 needed to enable sheet movement through the direct optical reader programmer 15. The square 21 is an example of one section of the modified coding sheet of FIG. 3. The small square 22 illustrates one of the special characters, numeric or alphabetic characters, written in by the programmer. Examples of the special characters are more clearly shown in FIGS. 4 and 5.

FIG. 6 is a detailed description of a representative optical reader programmer. The feeding units 24 and 25 are used initially to guide the coding form of FIG. 3 through the optical reading device. At the opposite end of the optical reading device are feed units 26 and 27, similar to units 24 and 25, to pull the coding form out of the apparatus. As the coding form passes through the optical reader, it is scanned by the optical reading device 23. The present invention utilizes this scanning method for producing electrical impulses which serve to identify the hand-written characters of the program for the computer in such a manner as to facilitate the transfer of said program onto the computer display screen; thereby allowing for corrections, verification or updating. The scanning method is already known and shown in various patents for automatically recognizing written symbols or numerals. The present invention seeks to utilize the best suited of prior art systems for the expressed purpose of incorporation in the computer system that previously would have been accomplished by a card reader.

Inlet shelf 28 is a retaining surface for the continuous coding form 29. Arrow 30 illustrates an accessory plug-in for another unit if needed. A stacker tray 31 is used for containing the coding forms as they come out of the reading device. Arrow 32 refers to a stationary support plug for the central processing unit of the computer. The block 33 is a schematic representation of mechanism for communication via phone lines for possible world wide hookup with other computers. The block 34 shows the control panel for the device which includes a start, stop and feed control. The feed for the device is effected by means of cogged rollers 38 and 40 which mesh with the perforations 19 on the coding sheet for moving the coding sheet through the optical reading device. A carrying handle 35 is shown for ease of portability of the device.

The invention being thus described, it will be obvious that the same may be varied in many ways. Such variations are not to be regarded as a departure from the scope of the invention, and all such modifications are intended to be included within the scope of the following claims.

What is claimed is:

1. In a programming process, the steps of preparing a written program in a special coding form, submitting said program to an optical reader, transmitting said program thru an acoustical coupler, incorporating said program into a central processing unit, and exhibiting said program on a display screen.

2. In a computer system,
   an input device including programmed sheets having pre-formed information characters inscribed thereon,
   transmitting means for transmitting said programmed sheets to an optical reader,
   direct connecting means for transmitting information from said optical reader to a central processing unit, and
   a display screen and print out device for listing and displaying said information.

3. In the computer system of claim 2, wherein said programmed sheets have perforations on the edges thereof engageable with cogs on said optical reader to move said sheets through said optical reader.

* * * * *